United States Patent
Yoshida et al.

(10) Patent No.: US 12,538,108 B2
(45) Date of Patent: Jan. 27, 2026

(54) DETECTION DEVICE, VEHICLE, DETECTION METHOD, AND DETECTION PROGRAM

(71) Applicants: SUMITOMO ELECTRIC INDUSTRIES, LTD., Osaka (JP); SUMITOMO WIRING SYSTEMS, LTD., Yokkaichi (JP); AUTONETWORKS TECHNOLOGIES, LTD., Yokkaichi (JP)

(72) Inventors: Keigo Yoshida, Osaka (JP); Hiroshi Ueda, Yokkaichi (JP); Naoki Adachi, Yokkaichi (JP); Shinichi Aiba, Yokkaichi (JP); Fumiya Ishikawa, Yokkaichi (JP); Shogo Kamiguchi, Yokkaichi (JP)

(73) Assignees: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP)

( * ) Notice: Subject to any disclaimer, the term of this patent is extended or adjusted under 35 U.S.C. 154(b) by 477 days.

(21) Appl. No.: 17/763,851

(22) PCT Filed: Oct. 22, 2020

(86) PCT No.: PCT/JP2020/039711
§ 371 (c)(1),
(2) Date: Mar. 25, 2022

(87) PCT Pub. No.: WO2021/106446
PCT Pub. Date: Jun. 3, 2021

(65) Prior Publication Data
US 2022/0417718 A1 Dec. 29, 2022

(30) Foreign Application Priority Data

Nov. 28, 2019 (JP) ................................. 2019-214823

(51) Int. Cl.
*H04W 4/48* (2018.01)
*H04W 12/106* (2021.01)

(52) U.S. Cl.
CPC ........... *H04W 4/48* (2018.02); *H04W 12/106* (2021.01)

(58) Field of Classification Search
CPC ............................ H04W 4/48; H04W 12/106
(Continued)

(56) References Cited

U.S. PATENT DOCUMENTS

2016/0381059 A1* 12/2016 Galula .................... H04L 63/02
726/23
2017/0093866 A1* 3/2017 Ben-Noon .......... H04W 12/068
(Continued)

FOREIGN PATENT DOCUMENTS

CN 105656944 A 6/2016
CN 106790050 A 5/2017
(Continued)

OTHER PUBLICATIONS

English Translation for JP-2017038291-A (Year: 2024).*
(Continued)

*Primary Examiner* — Mahmoud S Ismail
(74) *Attorney, Agent, or Firm* — Oliff PLC

(57) ABSTRACT

A detection device configured to detect an unauthorized message in an in-vehicle network installed in a vehicle includes: a monitoring unit configured to monitor messages transmitted in the in-vehicle network; a calculation unit configured to, on the basis of a monitoring result by the monitoring unit, calculate a statistic value regarding target
(Continued)

messages that have been transmitted in the in-vehicle network in a predetermined period and that are each a message having identification information provided for each kind of target information to be used in the vehicle; and a detection unit configured to perform a detection process of detecting the unauthorized message on the basis of the statistic value calculated by the calculation unit.

7 Claims, 8 Drawing Sheets

(58) Field of Classification Search
USPC .......................................................... 701/36
See application file for complete search history.

(56) References Cited

U.S. PATENT DOCUMENTS

| | | | |
|---|---|---|---|
| 2018/0262466 A1* | 9/2018 | Atad | ................... H04L 63/0245 |
| 2018/0316584 A1 | 11/2018 | Ujiie et al. | |
| 2020/0334926 A1* | 10/2020 | Tsurumi | ................ H04W 12/61 |
| 2021/0105292 A1 | 4/2021 | Hamada | |

FOREIGN PATENT DOCUMENTS

| | | | |
|---|---|---|---|
| CN | 108028790 A | | 5/2018 |
| JP | 2017038291 A | * | 2/2017 |
| JP | 2019-029960 A | | 2/2019 |
| WO | 2018/168291 A1 | | 9/2018 |
| WO | 2019/142180 A1 | | 7/2019 |

OTHER PUBLICATIONS

Xin Xi, Gang Li, Lun Yu, Shi Jian, "Theory & Practice of Information Port", (2000), pp. 223-229.
Jun. 22, 2023 Office Action issued in Chinese Patent Application No. 202080068680.4.
Jan. 12, 2021 International Search Report issued in International Patent Application No. PCT/JP2020/039711.
May 17, 2022 International Preliminary Report on Patentability issued in International Patent Application No. PCT/JP2020/039711.
Keigo Yoshida et al. "Survey on Security for DoIP, Some/IP and Study of Intrusion Detection". Symposium of Information Processing Society of Japan: Computer Security Symposium 2019 [online]. Oct. 21, 2019, pp. 48-54.

* cited by examiner

FIG. 3

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| TYPE | | | | | | | | Index 1st options | | | | | | | | Index 2nd options | | | | | | | | # of opt 1 | | | | # of opt 2 | | | |
| SERVICE ID | | | | | | | | | | | | | | | | INSTANCE ID | | | | | | | | | | | | | | | |
| Major Version | | | | | | | | Initial Data Requested Flag | TTL | | | | | | | | | | | | | | | | | | | | | | |
| Reserved | | | | | | | | | Reserved2 | | | | | | | Counter | | | | | | | | Eventgroup ID | | | | | | | |

DETECTION DEVICE, VEHICLE, DETECTION METHOD, AND DETECTION PROGRAM

TECHNICAL FIELD

The present disclosure relates to a detection device, a vehicle, a detection method, and a detection program.

This application claims priority on Japanese Patent Application No. 2019-214823 filed on Nov. 28, 2019, the entire content of which is incorporated herein by reference.

BACKGROUND ART

PATENT LITERATURE 1 (US Patent Application Publication No. 2017/0093866) discloses a system as follows. That is, the system includes: an in-vehicle network including an interface port for connecting an external device to the in-vehicle network; and a security unit connected to the in-vehicle network, the security unit being adapted to enable, on the basis of a security token received from an external device, communication via the interface port between the external device and the in-vehicle network.

PATENT LITERATURE 2 (International Publication No. WO2019/142180) discloses a system as follows. That is, the system is a system for monitoring intrusion abnormalities in an automotive environment. The system includes: a telematic control unit; a plurality of engine control units, each of the plurality of engine control units being associated with a local security monitor and a diagnostic communication manager configured to receive information regarding intrusion abnormalities detected by the local security monitor; and an abnormality analyzer configured to perform communication between each of the diagnostic communication managers and the telematic control unit by utilizing a diagnosis over an internet protocol, the abnormality analyzer being configured to accumulate the information regarding intrusion abnormalities detected by the local security monitors.

CITATION LIST

Patent Literature

PATENT LITERATURE 1: US Patent Application Publication No. 2017/0093866
PATENT LITERATURE 2: International Publication WO2019/142180

SUMMARY OF THE INVENTION

A detection device of the present disclosure is configured to detect an unauthorized message in an in-vehicle network installed in a vehicle. The detection device includes: a monitoring unit configured to monitor messages transmitted in the in-vehicle network; a calculation unit configured to, on the basis of a monitoring result by the monitoring unit, calculate a statistic value regarding target messages that have been transmitted in the in-vehicle network in a predetermined period and that are each a message having identification information provided for each kind of target information to be used in the vehicle; and a detection unit configured to perform a detection process of detecting the unauthorized message on the basis of the statistic value calculated by the calculation unit.

A detection method of the present disclosure is to be performed in a detection device configured to detect an unauthorized message in an in-vehicle network installed in a vehicle. The detection method includes the steps of: monitoring messages transmitted in the in-vehicle network; calculating, on the basis of a monitoring result, a statistic value regarding target messages that have been transmitted in the in-vehicle network in a predetermined period and that are each a message having identification information provided for each kind of target information to be used in the vehicle; and performing a detection process of detecting the unauthorized message on the basis of the calculated statistic value.

A detection program of the present disclosure is to be used in a detection device configured to detect an unauthorized message in an in-vehicle network installed in a vehicle. The detection program is for causing a computer to function as: a monitoring unit configured to monitor messages transmitted in the in-vehicle network; a calculation unit configured to, on the basis of a monitoring result by the monitoring unit, calculate a statistic value regarding target messages that have been transmitted in the in-vehicle network in a predetermined period and that are each a message having identification information provided for each kind of target information to be used in the vehicle; and a detection unit configured to perform a detection process of detecting the unauthorized message on the basis of the statistic value calculated by the calculation unit.

One mode of the present disclosure can be realized not only as a detection device that includes such a characteristic processing unit, but also as a semiconductor integrated circuit that realizes a part or all of the detection device, or as a program for causing a computer to execute the process steps performed in the detection device.

BRIEF DESCRIPTION OF DRAWINGS

FIG. 3 shows an example of a SOME/IP frame transmitted/received by an in-vehicle ECU according to the embodiment of the present disclosure.

DETAILED DESCRIPTION

Figure 1:
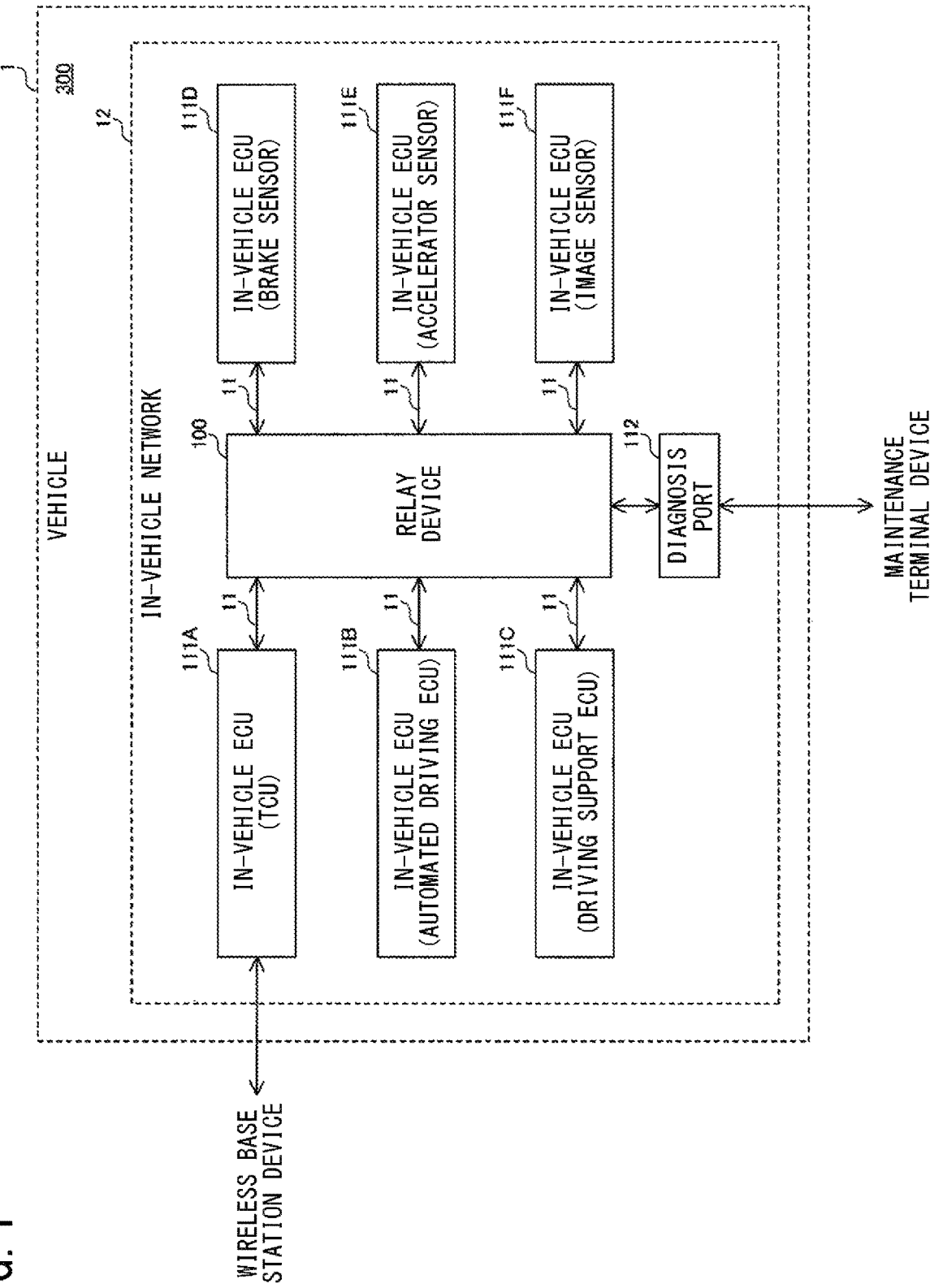
FIG. 1 shows a configuration of an in-vehicle communication system according to an embodiment of the present disclosure.

To date, technologies for improving security in in-vehicle networks have been developed.

Problems to be Solved by the Present Disclosure

Exceeding the technologies described in PATENT LITERATURE 1 and 2, a technology that enables more accurate detection of an unauthorized message in an in-vehicle network is desired.

The present disclosure has been made in order to solve the above-described problem. An object of the present disclosure is to provide a detection device, a vehicle, a detection method, and a detection program that enable more accurate detection of an unauthorized message in an in-vehicle network.

Effects of the Present Disclosure

According to the present disclosure, an unauthorized message in an in-vehicle network can be more accurately detected.

Description of Embodiment of the Present Disclosure

First, contents of the embodiment of the present disclosure are listed and described.

(1) A detection device according to the embodiment of the present disclosure is configured to detect an unauthorized message in an in-vehicle network installed in a vehicle. The detection device includes: a monitoring unit configured to monitor messages transmitted in the in-vehicle network; a calculation unit configured to, on the basis of a monitoring result by the monitoring unit, calculate a statistic value regarding target messages that have been transmitted in the in-vehicle network in a predetermined period and that are each a message having identification information provided for each kind of target information to be used in the vehicle; and a detection unit configured to perform a detection process of detecting the unauthorized message on the basis of the statistic value calculated by the calculation unit.

Thus, due to the configuration in which an unauthorized message is detected on the basis of a statistic value regarding the target messages each having identification information, if, for example, whether or not the calculated statistic value is abnormal is determined on the basis of a result of comparison between the calculated statistic value and a threshold set in advance on the basis of a statistic value regarding normal target messages, it is possible to improve detection accuracy of an unauthorized message. Therefore, an unauthorized message in the in-vehicle network can be more accurately detected.

(2) Preferably, the target message is a message for inquiring whether or not provision of the target information is possible.

With this configuration, it is possible to accurately detect, for example, an unauthorized message masquerading as a service search frame which is a frame according to a communication standard of SOME/IP (Scalable Service-Oriented Middleware on Ethernet/Internet Protocol) and which is a message for inquiring whether or not provision of target information is possible.

(3) Preferably, the target message is a message from an external device connected to the in-vehicle network, the message being for starting, in a relay device in the in-vehicle network, relay of information between an in-vehicle device in the in-vehicle network and the external device.

With this configuration, it is possible to accurately detect, for example, an unauthorized message masquerading as a relay request frame which is a frame according to a communication standard of DoIP (Diagnostics over Internet Protocol) and which is a message for starting relay of information between an in-vehicle device in the in-vehicle network and an external device such as a maintenance terminal device.

(4) Preferably, the calculation unit calculates, as the statistic value, the number of the target messages of which data lengths are less than a predetermined value, out of the target messages that have been transmitted in the in-vehicle network in the predetermined period.

The data length of an unauthorized target message is set to be short in general. In this regard, with the configuration in which an unauthorized message is detected by using, as a statistic value, the number of target messages of which the data lengths are less than a predetermined value, the unauthorized message can be more effectively detected.

(5) Preferably, the calculation unit calculates, as the statistic value, the number of the target messages that have predetermined identification information, out of the target messages that have been transmitted in the in-vehicle network in the predetermined period.

The frequency of transmission of a target message corresponding to target information of a kind for which the use frequency is low, is low in general. In this regard, with the configuration in which a certain kind of target information, e.g., target information of a kind for which the use frequency is low, is focused on, and the number of target messages corresponding to the target information is used as a statistic value, to detect an unauthorized message, the unauthorized message can be more effectively detected.

(6) Preferably, the calculation unit calculates, as the statistic value, a total number of the target messages for each piece of the identification information that have been transmitted in the in-vehicle network in the predetermined period.

In general, the frequency of transmission of an unauthorized target message is higher than the frequency of transmission of a normal target message. In this regard, as described above, with the configuration in which the total number of target messages for each piece of identification information is used as a statistic value, to detect an unauthorized message, the unauthorized message can be more effectively detected.

(7) A vehicle according to the embodiment of the present disclosure includes the detection device.

With this configuration, in the vehicle including the detection device, an unauthorized message in the in-vehicle network can be more accurately detected.

(8) A detection method according to the embodiment of the present disclosure is to be performed in a detection device configured to detect an unauthorized message in an in-vehicle network installed in a vehicle. The detection method includes the steps of: monitoring messages transmitted in the in-vehicle network; calculating, on the basis of a monitoring result, a statistic value regarding target messages that have been transmitted in the in-vehicle network in a predetermined period and that are each a message having identification information provided for each kind of target information to be used in the vehicle; and performing a detection process of detecting the unauthorized message on the basis of the calculated statistic value.

Thus, due to the method in which an unauthorized message is detected on the basis of a statistic value regarding the target messages each having identification information, if, for example, whether or not the calculated statistic value is abnormal is determined on the basis of a result of comparison between the calculated statistic value and a threshold set in advance on the basis of a statistic value regarding normal target messages, it is possible to improve detection accuracy of an unauthorized message. Therefore, an unauthorized message in the in-vehicle network can be more accurately detected.

(9) A detection program according to the embodiment of the present disclosure is to be used in a detection device configured to detect an unauthorized message in an in-vehicle network installed in a vehicle. The detection program is for causing a computer to function as: a monitoring unit configured to monitor messages transmitted in the in-vehicle network; a calculation unit configured to, on the basis of a monitoring result by the monitoring unit, calculate a statistic value regarding target messages that have been transmitted in the in-vehicle network in a predetermined period and that are each a message having identification information provided for each kind of target information to be used in the vehicle; and a detection unit configured to perform a detection process of detecting the unauthorized message on the basis of the statistic value calculated by the calculation unit.

Thus, due to the configuration in which an unauthorized message is detected on the basis of a statistic value regarding the target messages each having identification information, if, for example, whether or not the calculated statistic value is abnormal is determined on the basis of a result of comparison between the calculated statistic value and a threshold set in advance on the basis of a statistic value regarding normal target messages, it is possible to improve detection accuracy of an unauthorized message. Therefore, an unauthorized message in the in-vehicle network can be more accurately detected.

Hereinafter, an embodiment of the present invention will be described with reference to the drawings. In the drawings, the same or corresponding parts are denoted by the same reference signs, and descriptions thereof are not repeated. At least some parts of the embodiment described below can be combined together as desired.

[Configuration and Basic Operation]

FIG. 1 shows a configuration of an in-vehicle communication system according to an embodiment of the present disclosure.

With reference to FIG. 1, an in-vehicle communication system 300 includes: one or a plurality of in-vehicle ECUs (Electronic Control Units) 111; and a relay device 100. Specifically, the in-vehicle communication system 300 includes in-vehicle ECUs 111A to 111F as the in-vehicle ECUs 111. Each in-vehicle ECU 111 is an example of the in-vehicle device.

The in-vehicle communication system 300 is installed in a vehicle 1. Each in-vehicle ECU 111 and the relay device 100 form an in-vehicle network 12.

In the in-vehicle network 12, each in-vehicle ECU 111 is connected to the relay device 100 via an Ethernet (registered trademark) cable 11, for example.

The in-vehicle communication system 300 need not necessarily be provided with six in-vehicle ECUs 111, and may be provided with five or less or seven or more in-vehicle ECUs 111.

The in-vehicle communication system 300 need not necessarily be provided with one relay device 100, and may be provided with two or more relay devices 100.

The relay device 100 is a central gateway (CGW), for example and can communicate with each in-vehicle ECU 111. The relay device 100 performs a relay process of relaying information transmitted/received between in-vehicle ECUs 111. More specifically, the relay device 100 relays a message transmitted from a certain in-vehicle ECU 111 and addressed to another in-vehicle ECU 111.

More specifically, the relay device 100 performs a relay process of a frame transmitted/received between in-vehicle ECUs 111 connected via Ethernet cables 11, in accordance with an Ethernet communication standard, for example. Hereinafter, a frame according to an Ethernet communication standard will be referred to as an Ethernet frame. An IP packet is stored in an Ethernet frame.

The relay device 100 functions as a detection device, and performs a detection process of detecting an unauthorized message in the in-vehicle network 12.

In the in-vehicle communication system 300, relay of an Ethernet frame need not necessarily be performed in accordance with the Ethernet communication standard. For example, relay of a frame may be performed in accordance with a communication standard such as CAN (Controller Area Network), FlexRay (registered trademark), MOST (Media Oriented Systems Transport) (registered trademark), or LIN (Local Interconnect Network).

The in-vehicle ECUs 111 are, for example, a TCU (Telematics Communication Unit), an automated driving ECU, an engine ECU, a sensor, a navigation device, a human machine interface, and the like.

In this example, the in-vehicle ECUs 111A, 111B, 111C, 111D, 111E, 111F are a TCU, an automated driving ECU, a driving support ECU, a brake sensor, an accelerator sensor, and an image sensor, respectively. Hereinafter, the in-vehicle ECUs 111A, 111B, 111C, 111D, 111E, 111F will also be referred to as a TCU 111A, an automated driving ECU 111B, a driving support ECU 111C, a brake sensor 111D, an accelerator sensor 111E, and an image sensor 111F, respectively.

The TCU 111A can perform wireless communication with a wireless base station device in accordance with a communication standard such as LTE (Long Term Evolution) or 3G, for example. More specifically, the TCU 111A can communicate with an external device being a device outside the vehicle 1, via a wireless base station device and using an IP packet, for example. The TCU 111A relays information that is transmitted/received between an external device and the relay device 100, and that is to be used in services such as navigation and remote maintenance, for example.

For example, the brake sensor 111D periodically or non-periodically transmits brake information indicating the brake pressure of the vehicle 1, to another in-vehicle ECU 111 such as the automated driving ECU 111B. The brake information is an example of target information used in the vehicle 1.

The accelerator sensor 111E periodically or non-periodically transmits accelerator information indicating an accelerator opening degree of the vehicle 1, to another in-vehicle ECU 111 such as the automated driving ECU 111B. The accelerator information is an example of target information used in the vehicle 1.

The image sensor 111F periodically or non-periodically transmits image information indicating a captured image of a region around the vehicle 1, to other in-vehicle ECUs 111 such as the automated driving ECU 111B and the driving support ECU 111C. The image information is an example of target information used in the vehicle 1.

When the automated driving ECU 111B has received, via the relay device 100, brake information, accelerator information, and image information from the brake sensor 111D, the accelerator sensor 111E, and the image sensor 111F, respectively, the automated driving ECU 111B performs automated driving control of the vehicle 1 on the basis of the various types of received information.

When the driving support ECU 111C has received image information from the image sensor 111F via the relay device 100, the driving support ECU 111C performs driving support such as lane departure warning to a driver, for example, on the basis of the received image information and the like.

That is, the brake sensor 111D is a service ECU that provides a service of making notification of brake information. The accelerator sensor 111E is a service ECU that provides a service of making notification of accelerator information. The image sensor 111F is a service ECU that provides a service of making notification of image information.

The automated driving ECU 111B is a client ECU that receives services from the brake sensor 111D, the accelerator sensor 111E, and the image sensor 111F. The driving support ECU 111C is a client ECU that receives a service from the image sensor 111F.

[Service-Oriented Communication]

Service ECUs and Client ECUs perform so-called service-oriented communication.

Each in-vehicle ECU 111 transmits/receives a frame according to a predetermined protocol in the service-oriented communication. For example, the in-vehicle ECU 111 transmits/receives a frame according to a communication standard of SOME/IP, which is a protocol of a higher order than the transport layer in an OSI (Open Systems Interconnection) reference model. Hereinafter, a frame according to the SOME/IP communication standard will also be referred to as a SOME/IP frame.

Figure 2:
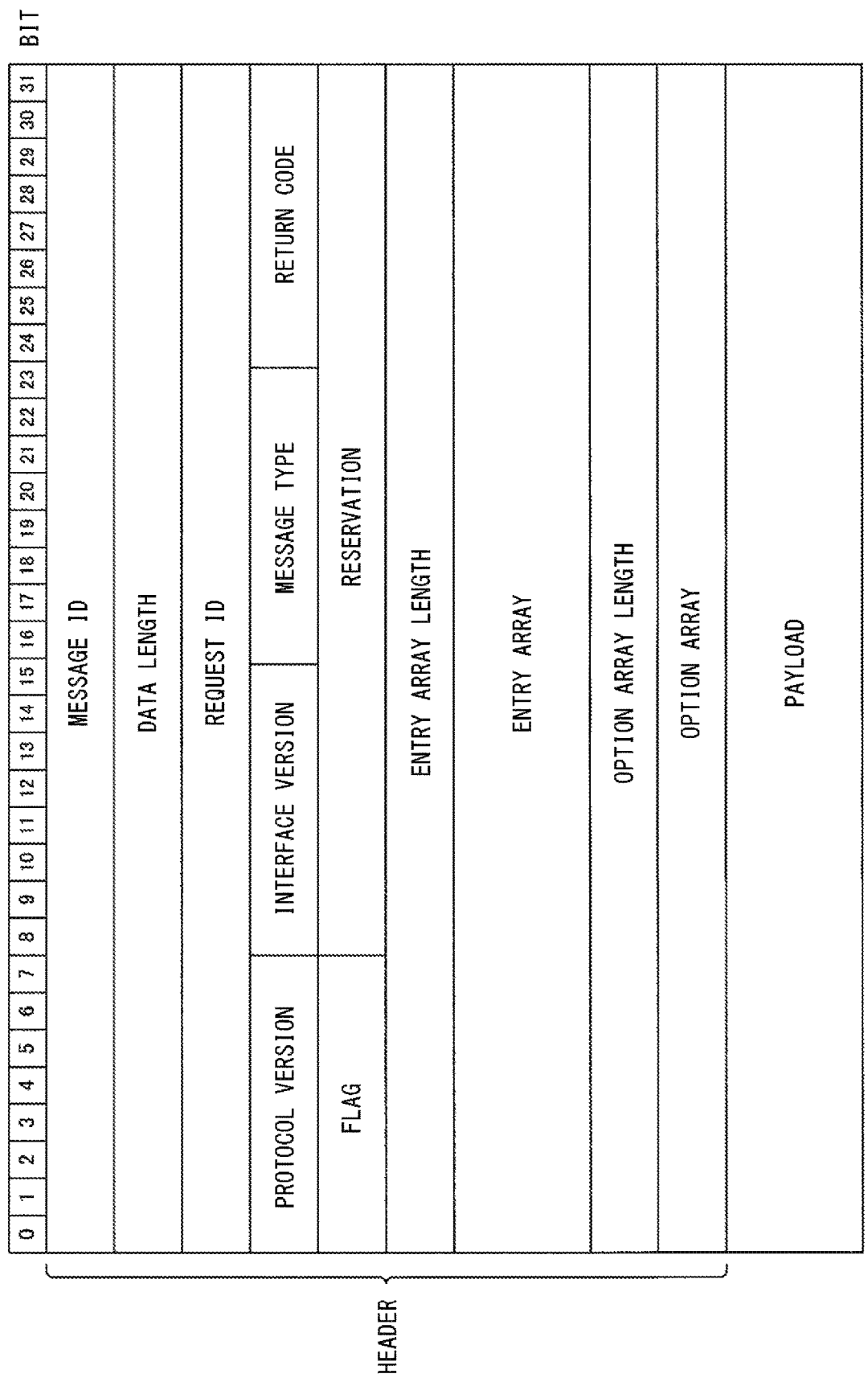
FIG. 2 shows an example of a SOME/IP frame transmitted/received by an in-vehicle ECU according to the embodiment of the present disclosure.

FIG. 2 shows an example of a SOME/IP frame transmitted/received by an in-vehicle ECU according to the embodiment of the present disclosure.

With reference to FIG. 2, the header of a SOME/IP frame has fields of message ID, data length, request ID, protocol version, interface version, message type, return code, flag, reservation, entry array length, entry array, option array length, and option array.

In the data length field, the data length of the payload of the SOME/IP frame is stored.

FIG. 3 shows an example of a SOME/IP frame transmitted/received by an in-vehicle ECU according to the embodiment of the present disclosure. FIG. 3 shows details of the entry array field of the frame shown in FIG. 2.

With reference to FIG. 3, the entry array field of the SOME/IP frame has fields of type, Index 1st options, Index 2st options, # of opt 1, # of opt 2, service ID, instance ID, Major Version, TTL (Time To Live), Reserve, Initial Data Requested Flag, Reserve2, Counter, and Eventgroup ID.

For example, there are cases where a new in-vehicle ECU 111 is added to the in-vehicle network 12 through an operation of a user of the vehicle 1. The in-vehicle ECU 111 added to the in-vehicle network 12 may be a service ECU or a client ECU.

When a client ECU has been added to the in-vehicle network 12, or at the time of activation, the client ECU transmits, to a service ECU via the relay device 100, a service discovery frame which is an example of the SOME/IP frame and which is for establishing communication connection for starting service-oriented communication with the service ECU in the in-vehicle network 12.

When the client ECU has established communication connection with the service ECU by transmitting/receiving the service discovery frame via the relay device 100, the client ECU performs service-oriented communication with the service ECU by using the SOME/IP frame. For example, when the service ECU has established communication connection with the client ECU, the service ECU provides a service to the client ECU by using a service provision frame which is an example of the SOME/IP frame.

More specifically, for example, when the client ECU has been added to the in-vehicle network 12, or at the time of activation, the client ECU generates a service search frame which is an example of the service discovery frame and which includes information to the effect that the client ECU is searching for a service of making notification of image information. Then, the client ECU multicasts the generated service search frame to other in-vehicle ECUs 111 via the relay device 100.

The service search frame is a message for inquiring whether or not provision of target information, such as image information, to be used in the vehicle 1 is possible.

In the message ID field in the service search frame from the client ECU, information capable of identifying a search target service such as notification of image information is stored, for example. More specifically, in the message ID field, a service number capable of identifying a search target service is stored. The service number is an example of identification information provided for each piece of target information to be used in the vehicle 1.

When the image sensor 111F being a service ECU has received the service search frame from the client ECU via the relay device 100, the image sensor 111F generates a service provision notification frame which is an example of the service discovery frame and which includes the MAC address of the image sensor 111F and information to the effect that the image sensor 111F can provide a service of making notification of image information. Then, the image sensor 111F transmits the generated service provision notification frame to the client ECU via the relay device 100, as a response to the service search frame.

When the client ECU has received the service provision notification frame from the image sensor 111F via the relay device 100, the client ECU generates a service subscription request frame which is an example of the service discovery frame and which includes the ID of the client ECU and information to the effect that transmission of image information is requested. Then, the client ECU transmits the generated service subscription request frame to the image sensor 111F via the relay device 100.

When the image sensor 111F has received the service subscription request frame from the client ECU via the relay device 100, the image sensor 111F determines whether or not to permit service subscription by the client ECU, i.e., whether or not to start making notification of image information to the client ECU, on the basis of the ID and the like of the client ECU included in the received service subscription request frame.

Then, the image sensor 111F generates a service subscription permission/non-permission frame which is an example of the service discovery frame and which includes information indicating the determined content. Then, the image sensor 111F transmits the generated service subscription permission/non-permission frame to the client ECU via the relay device 100, as a response to the service subscription request frame.

When the image sensor 111F has determined to start provision of the service to the client ECU, the relay device 100 enables a relay process of a SOME/IP frame to be transmitted/received between the image sensor 111F and the client ECU.

Then, the image sensor 111F periodically or non-periodically transmits a service provision frame which is an example of the SOME/IP frame, to the client ECU via the relay device 100. More specifically, the image sensor 111F periodically or non-periodically transmits a service provision frame that includes image information, to the client ECU via the relay device 100.

[Communication with Maintenance Terminal Device]

The relay device 100 can transmit/receive, for example, update data for firmware, data accumulated by the relay device 100, and the like via a diagnosis port 112 and a maintenance terminal device outside the vehicle 1. The maintenance terminal device is an example of an external device.

The maintenance terminal device connected to the relay device 100 and the diagnosis port 112 transmits/receives a frame in accordance with a communication standard of DoIP, which is a protocol of a higher order than the transport layer in the OSI reference model, for example. Hereinafter, a frame according to the DoIP communication standard will also be referred to as a DoIP frame.

Figure 4:
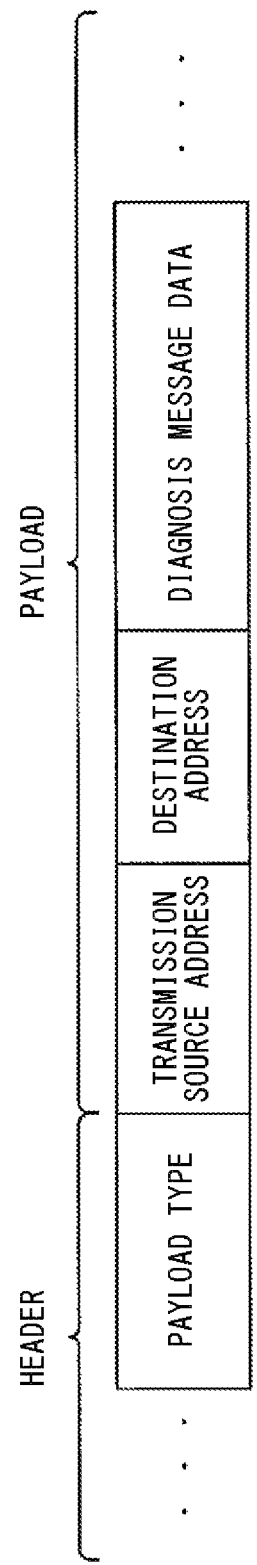
FIG. 4 shows an example of a DoIP frame transmitted/received by an in-vehicle ECU according to the embodiment of the present disclosure.

FIG. 4 shows an example of a DoIP frame transmitted/received by an in-vehicle ECU according to the embodiment of the present disclosure.

With reference to FIG. 4, the header of a DoIP frame has a field of payload type. The payload of the DoIP frame has fields of transmission source address and destination address, as logical address information, and a field of diagnosis message data.

In the payload type field, the data length of the payload of the DoIP frame is stored.

For example, when a maintenance terminal device has been connected to the diagnosis port 112, the relay device 100 transmits, to the maintenance terminal device, a vehicle information notification frame which is an example of the DoIP frame and which includes, in the payload, the VIN (Vehicle Identification Number) and the unique number, etc., of each in-vehicle ECU 111 in the in-vehicle network 12.

When the maintenance terminal device has received the vehicle information notification frame from the relay device 100, the maintenance terminal device transmits, to the relay device 100, a relay request frame which is an example of the DoIP frame and which is for establishing communication connection with an in-vehicle ECU 111 in the in-vehicle network 12.

The relay request frame is a message for starting, in the relay device 100, relay of information between the maintenance terminal device and an in-vehicle ECU 111 in the in-vehicle network 12.

In the destination address field in the relay request frame from the maintenance terminal device, the logical address of an in-vehicle ECU 111 is stored. More specifically, for example, in the destination address field in the relay request frame transmitted by the maintenance terminal device and addressed to a service ECU, the logical address of the service ECU is stored. The logical address is an example of identification information provided for each piece of target information to be used in the vehicle 1.

When the relay device 100 has received the relay request frame from the maintenance terminal device, the relay device 100 enables a relay process of a frame transmitted/received between the maintenance terminal device and the in-vehicle ECU 111 indicated by the destination address in the relay request frame.

Upon establishment of communication connection with the in-vehicle ECU 111, the maintenance terminal device transmits update data for firmware to the in-vehicle ECU 111, and sends a transmission request of accumulated data, to the in-vehicle ECU 111, for example.

[Configuration of Relay Device]

Figure 5:
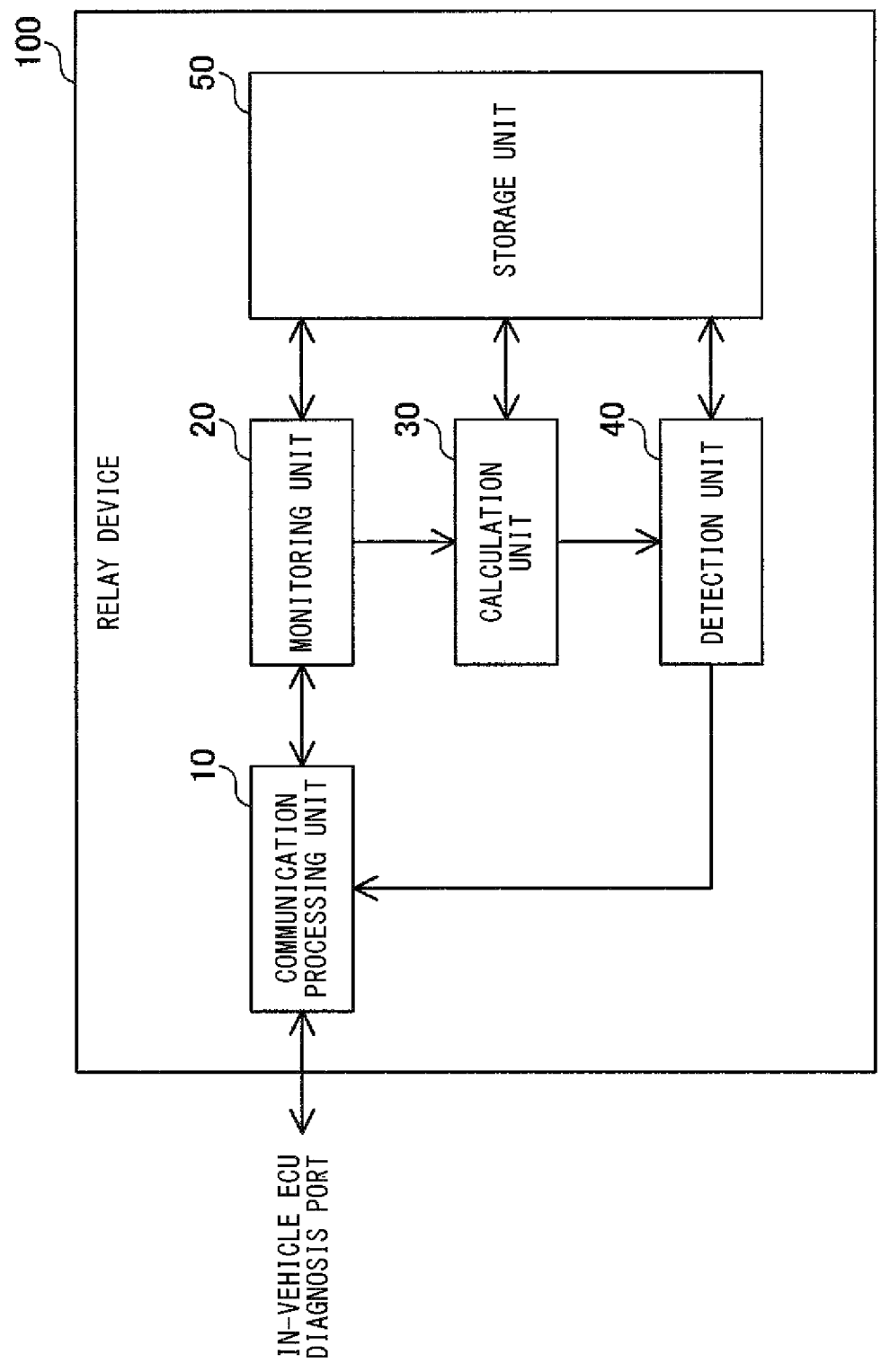
FIG. 5 shows an example a configuration of a relay device according to the embodiment of the present disclosure.

FIG. 5 shows an example of a configuration of the relay device according to the embodiment of the present disclosure.

With reference to FIG. 5, the relay device 100 includes a communication processing unit 10, a monitoring unit 20, a calculation unit 30, a detection unit 40, a storage unit 50, and a plurality of communication ports (not shown).

The communication processing unit 10, the monitoring unit 20, the calculation unit 30, and the detection unit 40 are realized by processors such as a CPU (Central Processing Unit) and a DSP (Digital Signal Processor), for example. The storage unit 50 is a flash memory, for example.

As described above, the relay device 100 functions as a detection device, and performs a detection process of detecting an unauthorized message in the in-vehicle network 12.

For example, there are cases where an external device performs service-oriented communication with an in-vehicle ECU 111 in the in-vehicle network 12 via the TCU 111A and the relay device 100. More specifically, for example, the external device transmits a service discovery frame to a service ECU via the TCU 111A and the relay device 100, thereby establishing communication connection with the service ECU, as in the case of the client ECU, and performs service-oriented communication with the service ECU by using a SOME/IP frame.

For example, when the service ECU has established communication connection with an unauthorized external device, the in-vehicle network 12 may be illegally accessed by the unauthorized external device.

For example, when the relay device 100 has enabled a relay process of a frame transmitted/received between an in-vehicle ECU 111 and an unauthorized maintenance terminal device, the in-vehicle network 12 may be illegally accessed by the unauthorized maintenance terminal device.

Therefore, the relay device 100 detects a service discovery frame from an unauthorized external device and a relay request frame from an unauthorized maintenance terminal device, as unauthorized messages, in the following manner.

[Communication Processing Unit]

The communication processing unit 10 performs a relay process of relaying a message transmitted between in-vehicle ECUs 111.

When the communication processing unit 10 has received, from an in-vehicle ECU 111 via a corresponding communication port out of a plurality of communication ports in the relay device 100, a frame addressed to another in-vehicle ECU 111, the communication processing unit 10 transmits the frame to the other in-vehicle ECU 111 via a corresponding communication port.

[Monitoring Unit]

The monitoring unit 20 monitors messages transmitted in the in-vehicle network 12.

For example, when the communication processing unit 10 has received a frame to be relayed, the monitoring unit 20 determines whether or not the frame received by the communication processing unit 10 is a target message being a message that has identification information, such as a service search frame according to the SOME/IP communication standard or a relay request frame according to the DoIP communication standard.

More specifically, the monitoring unit 20 confirms the port number of the UDP header of the frame received by the communication processing unit 10.

For example, when the port number of the frame matches a port number allocated in advance to a SOME/IP frame, the monitoring unit 20 determines that the frame is a SOME/IP frame.

With reference to FIG. 2 again, when the monitoring unit 20 has determined that the frame received by the communication processing unit 10 is a SOME/IP frame, the monitoring unit 20 determines whether or not the SOME/IP frame is a service discovery frame, on the basis of the message ID in the header of the SOME/IP frame.

With reference to FIG. 3 again, next, when the monitoring unit 20 has determined that the frame received by the communication processing unit 10 is a service discovery frame, the monitoring unit 20 determines whether or not the service discovery frame is a service search frame, on the basis of the type or the message type in the header of the service discovery frame.

Next, when the monitoring unit 20 has determined that the frame received by the communication processing unit 10 is a service search frame, the monitoring unit 20 obtains, as identification information Y1, the service number stored in the service ID field in the header of the service search frame, and obtains, as data length information X1, the data length stored in the data length field. Then, the monitoring unit 20 outputs each piece of the obtained information to the calculation unit 30, as monitored information.

For example, when the port number of the frame matches a port number allocated in advance to a DoIP frame, the monitoring unit 20 determines that the frame is a DoIP frame.

With reference to FIG. 4 again, when the monitoring unit 20 has determined that the frame received by the communication processing unit 10 is a DoIP frame, the monitoring unit 20 determines whether or not the DoIP frame is a relay request frame, on the basis of the payload type in the header of the DoIP frame.

Next, when the monitoring unit 20 has determined that the frame received by the communication processing unit 10 is a relay request frame, the monitoring unit 20 obtains, as identification information Y2, the logical address stored in the destination address field of the relay request frame, and obtains, as data length information X2, the data length stored in the payload type field. Then, the monitoring unit 20 outputs each piece of the obtained information to the calculation unit 30, as monitored information.

[Calculation Unit]

On the basis of the monitoring result by the monitoring unit 20, the calculation unit 30 calculates a statistic value regarding service search frames that have been transmitted in the in-vehicle network 12 in a predetermined period Ta and that are each a message having identification information Y1 provided for each kind of target information to be used in the vehicle 1.

On the basis of the monitoring result by the monitoring unit 20, the calculation unit 30 calculates a statistic value regarding relay request frames that have been transmitted in the in-vehicle network 12 in a predetermined period Tb and that are each a message having identification information Y2 provided for each kind of target information to be used in the vehicle 1.

More specifically, when the calculation unit 30 has received monitored information from the monitoring unit 20, the calculation unit 30 calculates, on the basis of the received monitored information, a statistic value regarding service search frames having been transmitted in the in-vehicle network 12 in the predetermined period Ta, and a statistic value regarding relay request frames having been transmitted in the in-vehicle network 12 in the predetermined period Tb.

The service search frame and the relay request frame are examples of the target message.

The predetermined period Ta and the predetermined period Tb may be the same with each other or different from each other. The start timing of the predetermined period Ta and the start timing of the predetermined period Tb may be the same with each other or different from each other.

For example, at predetermined time intervals T1, the calculation unit 30 calculates a statistic value regarding service search frames having been transmitted in the in-vehicle network 12 in the predetermined period Ta starting from a time (T1×m). Here, m is a positive integer.

The time interval T1 may be set to be the same as the predetermined period Ta, whereby the monitoring periods may be temporally continuous with each other. The time interval T1 may be set to be shorter than the predetermined period Ta, whereby the monitoring periods may temporally and partially overlap each other. The time interval T1 may be set to be longer than the predetermined period Ta, whereby the monitoring periods may be intermittently provided.

For example, at predetermined time intervals T2, the calculation unit 30 calculates a statistic value regarding relay request frames having been transmitted in the in-vehicle network 12 in the predetermined period Tb starting from a time (T2×n). Here, n is a positive integer.

The time interval T2 may be set to be the same as the predetermined period Tb, whereby the monitoring periods may be temporally continuous with each other. The time interval T2 may be set to be shorter than the predetermined period Tb, whereby the monitoring periods may temporally and partially overlap each other. The time interval T2 may be set to be longer than the predetermined period Tb, whereby the monitoring period may be intermittently provided.

(Statistic Value Based on Data Length)

For example, as a statistic value S1, the calculation unit 30 calculates the number of service search frames of which the data lengths are less than a predetermined value, out of the service search frames having been transmitted in the in-vehicle network 12 in the predetermined period Ta. For example, as a statistic value S2, the calculation unit 30 calculates the number of relay request frames of which the data lengths are less than a predetermined value, out of the relay request frames having been transmitted in the in-vehicle network 12 in the predetermined period Tb.

For example, the storage unit 50 has stored therein a threshold regarding the data length. For example, the threshold in the storage unit 50 is 64 bytes.

When the calculation unit 30 has received monitored information from the monitoring unit 20, the calculation unit 30 compares the data length indicated by the data length information X1, X2 included in the received monitored information with the threshold in the storage unit 50. The threshold regarding the data length shown by the data length information X1 and the threshold regarding the data length indicated by the data length information X2 may be the same with each other or different from each other.

Then, as the statistic value S1, the calculation unit 30 calculates the number of service search frames of which the data lengths indicated by the data length information X1 are less than 64 bytes, out of the service search frames having been transmitted in the in-vehicle network 12 in the predetermined period Ta.

As the statistic value S2, the calculation unit 30 calculates the number of relay request frames of which the data lengths indicated by the data length information X2 are less than 64 bytes, out of the relay request frames having been transmitted in the in-vehicle network 12 in the predetermined period Tb.

(Statistic Value Based on Identification Information)

For example, as a statistic value S3, the calculation unit 30 calculates the number of service search frames that have predetermined identification information, out of the service search frames having been transmitted in the in-vehicle network 12 in the predetermined period Ta. For example, as a statistic value S4, the calculation unit 30 calculates the number of relay request frames that have predetermined identification information, out of the relay request frames having been transmitted in the in-vehicle network 12 in the predetermined period Tb.

For example, the storage unit 50 has stored therein, as a specific service number, the service number of a service that has a use frequency being less than a predetermined value, out of the services provided by the respective service ECUs in the in-vehicle network 12. For example, the storage unit 50 has stored therein, as a specific logical address, the logical address of a service ECU that provides the service indicated by the specific service number.

For example, the specific service number in the storage unit 50 is the service number of the service provided by the accelerator sensor 111E, and the specific logical address in the storage unit 50 is the logical address of the accelerator sensor 111E.

When the calculation unit 30 has received monitored information from the monitoring unit 20, the calculation unit 30 compares the service number indicated by the identification information Y1 included in the received monitored information with the specific service number in the storage unit 50.

Then, as the statistic value S3, the calculation unit 30 calculates the number of service search frames of which the service numbers indicated by the identification information Y1 match the specific service number, out of the service search frames having been transmitted in the in-vehicle network 12 in the predetermined period Ta.

As the statistic value S4, the calculation unit 30 calculates the number of service search frames of which the logical addresses indicated by the identification information Y2 match the specific logical address, out of the relay request frames having been transmitted in the in-vehicle network 12 in the predetermined period Tb.

(Statistic Value Based on Total Number of Messages)

For example, as a statistic value S5, the calculation unit 30 calculates the total number of service search frames for each piece of identification information that have been transmitted in the in-vehicle network 12 in the predetermined period Ta. For example, as a statistic value S6, the calculation unit 30 calculates the total number of relay request frames for each piece of identification information that have been transmitted in the in-vehicle network 12 in the predetermined period Tb.

When the calculation unit 30 has received monitored information from the monitoring unit 20, the calculation unit 30 calculates, as the statistic value S5, the total number of service search frames having been transmitted in the in-vehicle network 12 in the predetermined period Ta, on the basis of the received monitored information.

When the calculation unit 30 has received monitored information from the monitoring unit 20, the calculation unit 30 calculates, as the statistic value S6, the total number of relay request frames having been transmitted in the in-vehicle network 12 in the predetermined period Tb, on the basis of the received monitored information.

The calculation unit 30 outputs the statistic values S1, S2, S3, S4, S5, S6 as statistic information, to the detection unit 40.

[Detection Unit]

The detection unit 40 performs a detection process of detecting an unauthorized message on the basis of the statistic values calculated by the calculation unit 30.

More specifically, when the detection unit 40 has received statistic information from the calculation unit 30, the detection unit 40 detects an unauthorized service search frame and an unauthorized relay request frame on the basis of the received statistic information.

For example, the storage unit 50 has stored therein six thresholds regarding the respective statistic values S1 to S6.

The detection unit 40 compares the statistic values S1, S2, S3, S4, S5, S6 indicated by the statistic information received from the calculation unit 30 with corresponding thresholds in the storage unit 50.

For example, when the statistic value S1, the statistic value S3, and the statistic value S5 are not less than corresponding thresholds, respectively, the detection unit 40 determines that a part or all of the service search frames having been transmitted in corresponding periods are unauthorized service search frames.

For example, when the statistic value S2, the statistic value S4, and the statistic value S5 are not less than corresponding thresholds, respectively, the detection unit 40 determines that a part or all of the relay request frames having been transmitted in corresponding periods are unauthorized relay request frames.

When the detection unit 40 has determined that a part or all of the service search frames having been transmitted in the corresponding periods are unauthorized service search frames, or have determined that a part or all of the relay request frames having been transmitted in the corresponding periods are unauthorized relay request frames, the detection unit 40 performs the following process.

That is, the detection unit 40 records information of service search frames or information of relay request frames that have been transmitted in the corresponding periods. The detection unit 40 transmits alarm information indicating that an unauthorized message is being transmitted in the in-vehicle network 12, to a higher-order device in the vehicle 1 or outside the vehicle 1 via the communication processing unit 10.

[Operation Flow]

Each device in the in-vehicle communication system according to the embodiment of the present disclosure includes a computer that includes a memory. An arithmetic processing unit such as a CPU in the computer reads out, from the memory, a program including a part or all of steps in the flow chart and sequence shown below, and executes the program. Programs of the plurality of devices can each be installed from outside. The programs of the plurality of devices are each distributed in a state of being stored in a storage medium.

Figure 6:
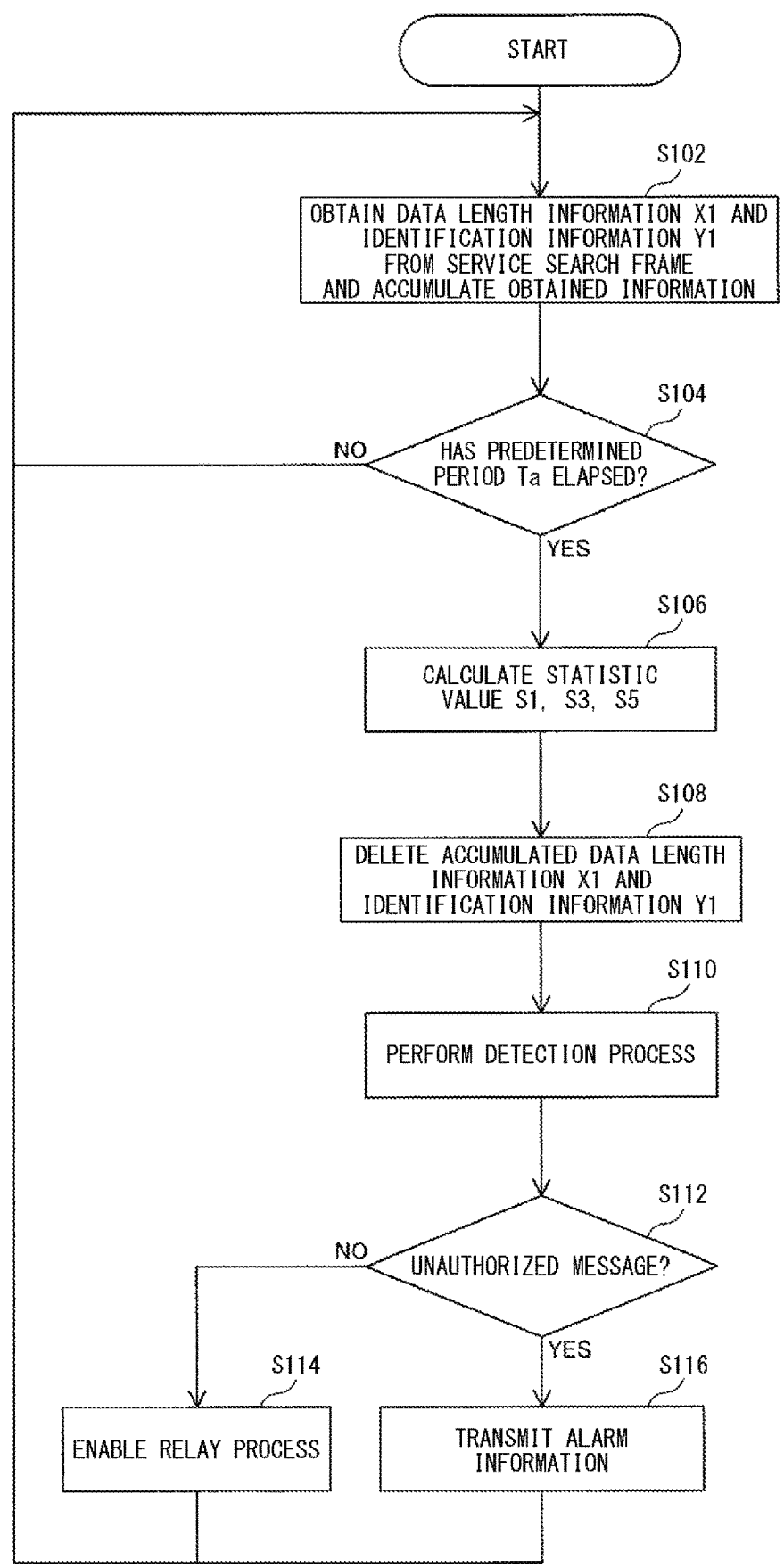
FIG. 6 is a flow chart describing an example of an operation procedure according to which the relay device performs a detection process in the in-vehicle communication system according to the embodiment of the present disclosure.

FIG. 6 is a flow chart describing an example of an operation procedure according to which the relay device performs a detection process in the in-vehicle communication system according to the embodiment of the present disclosure.

With reference to FIG. 6, first, the relay device 100 monitors messages transmitted in the in-vehicle network 12, and when having received a service search frame, the relay device 100 obtains data length information X1 and identification information Y1 from the received service search frame, and accumulates these pieces of information into the storage unit 50 (step S102).

Next, the relay device 100 repeats accumulation of data length information X1 and identification information Y1 until the predetermined period Ta has elapsed (NO in step S104). When the predetermined period Ta has elapsed (YES in step S104), the relay device 100 calculates, on the basis of the monitoring result, the statistic values S1, S3, S5 regarding the target messages having been transmitted in the in-vehicle network 12 in the predetermined period Ta. More specifically, on the basis of the data length information X1 and the identification information Y1 accumulated in the storage unit 50 in the predetermined period Ta, the relay device 100 calculates the statistic values S1, S3, S5 (step S106).

Next, the relay device 100 deletes the data length information X1 and the identification information Y1 accumulated in the storage unit 50 (step S108).

Next, on the basis of the calculated statistic values S1, S3, S5, the relay device 100 performs a detection process of detecting an unauthorized message (step S110).

Next, as a result of the detection process, when the relay device 100 has determined that each service search frame having been transmitted in the predetermined period Ta is not an unauthorized message (NO in step S112), the relay device 100 enables a relay process of a SOME/IP frame transmitted/received between a service ECU and a client ECU in the service-oriented communication that is established on the basis of the service discovery frame such as the service search frame (step S114).

Meanwhile, as a result of the detection process, when the relay device 100 has determined that a part or all of the service search frames having been transmitted in the predetermined period Ta are unauthorized service search frames (YES in step S112), the relay device 100 transmits alarm information indicating that an unauthorized message is being transmitted, to a higher-order device inside the vehicle 1 or outside the vehicle 1 (step S116).

Then, the relay device 100 receives new service search frames, and accumulates data length information X1 and identification information Y1 into the storage unit 50 (step S102).

The relay device 100 may be configured to perform the process of step S102 and the processes of step S106 to S116 in parallel.

Figure 7:
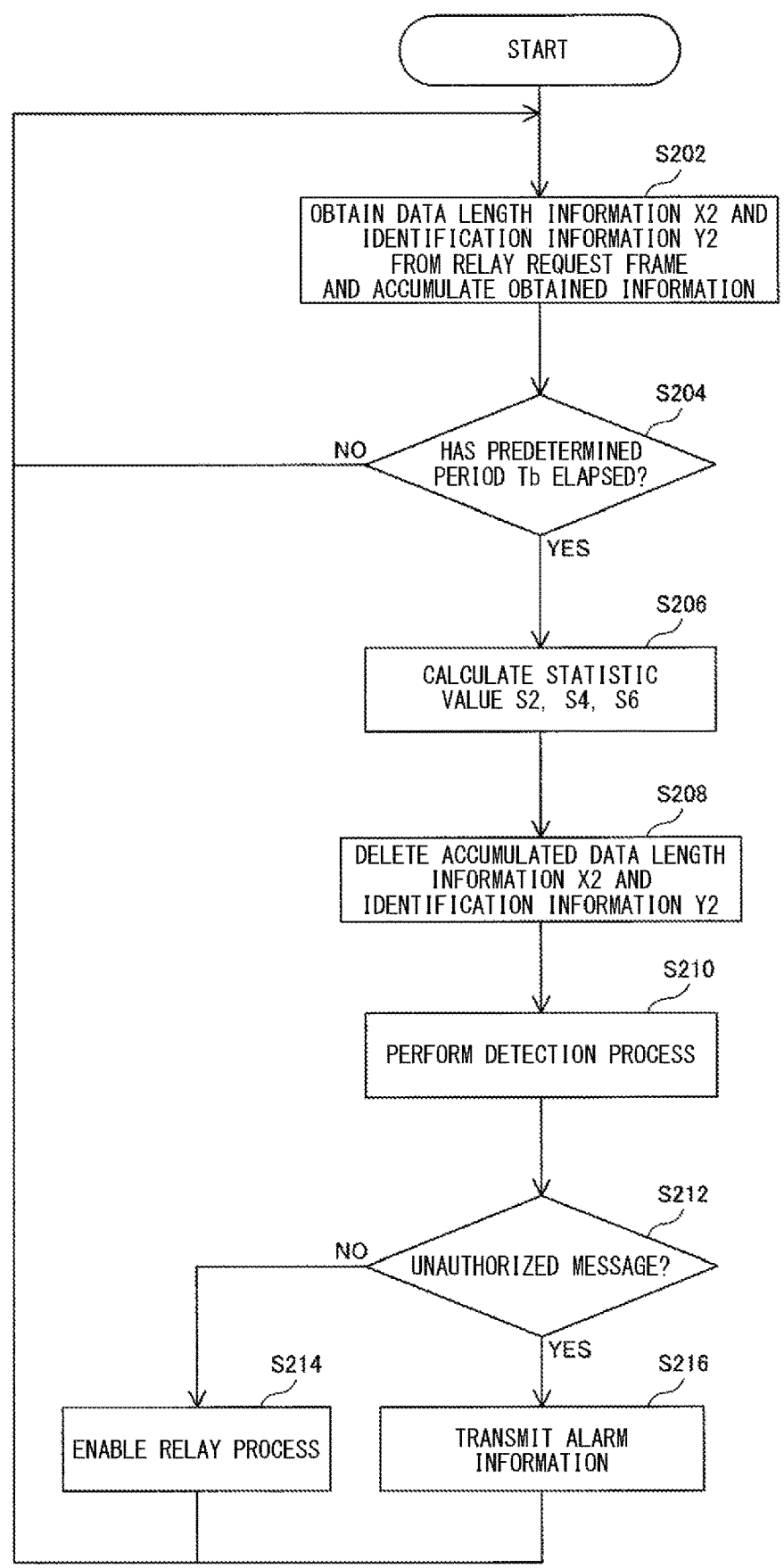
FIG. 7 is a flow chart describing another example of an operation procedure according to which the relay device performs a detection process in the in-vehicle communication system according to the embodiment of the present disclosure.

FIG. 7 is a flow chart describing another example of an operation procedure according to which the relay device performs a detection process in the in-vehicle communication system according to the embodiment of the present disclosure.

With reference to FIG. 7, first, the relay device 100 monitors messages transmitted in the in-vehicle network 12, and when having received a relay request frame, the relay device 100 obtains data length information X2 and identification information Y2 from the received relay request frame and accumulates the pieces of information into the storage unit 50 (step S202).

Next, the relay device 100 repeats accumulation of data length information X2 and identification information Y2 until the predetermined period Tb has elapsed (NO in step S204). When the predetermined period Tb has elapsed (YES in step S204), the relay device 100 calculates, on the basis of the monitoring result, the statistic values S2, S4, S6 regarding the target messages having been transmitted in the in-vehicle network 12 in the predetermined period Tb. More specifically, on the basis of the data length information X2 and the identification information Y2 accumulated in the storage unit 50 in the predetermined period Tb, the relay device 100 calculates the statistic values S2, S4, S6 (step S206).

Next, the relay device 100 deletes the data length information X2 and the identification information Y2 accumulated in the storage unit 50 (step S208).

Next, on the basis of the calculated statistic values S2, S4, S6, the relay device 100 performs a detection process of detecting an unauthorized message (step S210).

Next, as a result of the detection process, when the relay device 100 has determined that each relay request frame having been transmitted in the predetermined period Tb is not an unauthorized message (NO in step S212), the relay device 100 enables a relay process of a DoIP frame such as the relay request frame (step S214).

Meanwhile, as a result of the detection process, when the relay device 100 has determined that a part or all of the relay request frames having been transmitted in the predetermined period Tb are unauthorized relay request frames (YES in step S212), the relay device 100 transmits alarm information indicating that an unauthorized message is being transmitted, to a higher-order device in the vehicle 1 or outside the vehicle 1 (step S216).

Then, the relay device 100 receives new relay request frames, and accumulates data length information X2 and identification information Y2 into the storage unit 50 (step S202).

The relay device 100 may be configured to perform the process of step S202 and the processes of step S206 to S216 in parallel.

In the in-vehicle communication system 300 according to the embodiment of the present disclosure, the relay device 100 detects an unauthorized message in the in-vehicle network 12. However, the present disclosure is not limited thereto. In the in-vehicle communication system 300, a device other than the relay device 100 may be configured to detect an unauthorized message in the in-vehicle network 12, as a detection device.

In the in-vehicle communication system 300 according to the embodiment of the present disclosure, the relay device 100 functioning as a detection device is directly connected to each Ethernet cable 11. However, the present disclosure is not limited thereto.

Figure 8:
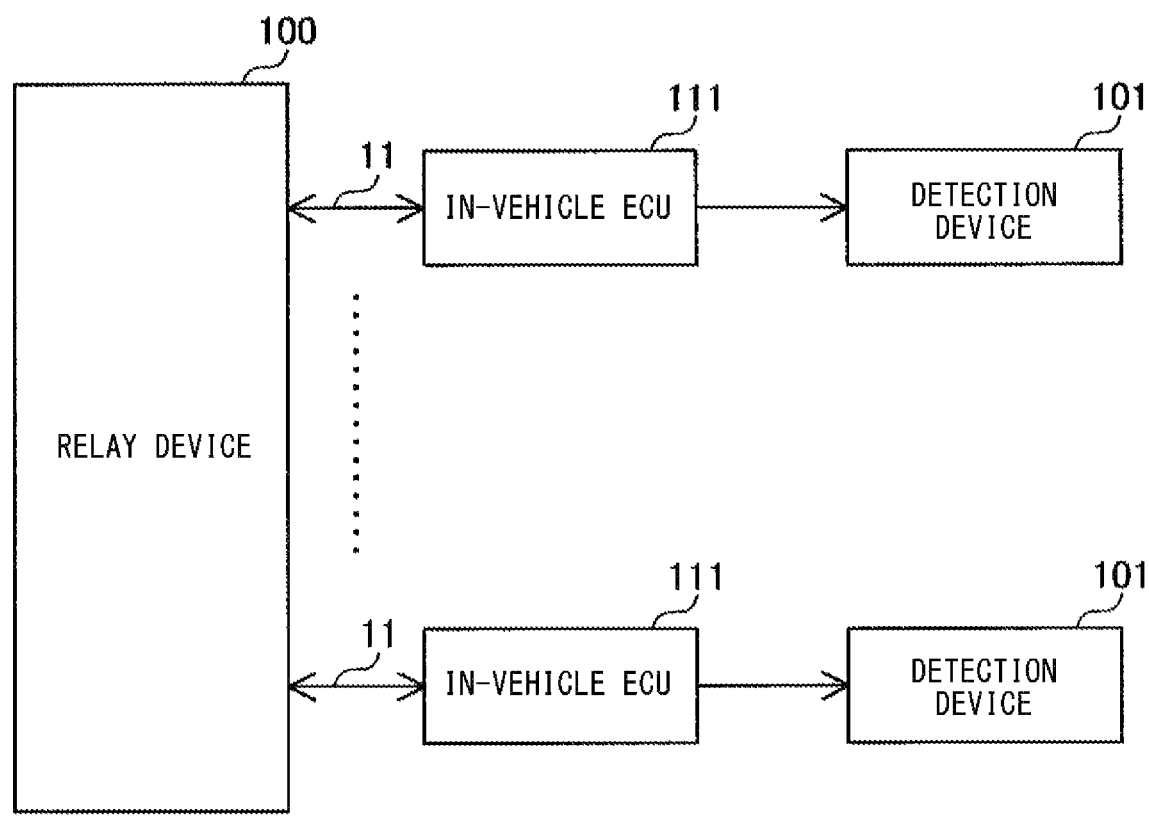
FIG. 8 shows an example of a connection topology of an in-vehicle network according to the embodiment of the present disclosure.

FIG. 8 shows an example of a connection topology of an in-vehicle network according to the embodiment of the present disclosure.

With reference to FIG. 8, each detection device 101 may be connected to an Ethernet cable 11 via an in-vehicle ECU 111. In this case, the detection device 101 monitors messages transmitted/received by the in-vehicle ECU, thereby detecting an unauthorized message transmitted to the Ethernet cable 11, for example.

In the relay device 100 according to the embodiment of the present disclosure, the monitoring unit 20 obtains data length information X1 and identification information Y1 from a service search frame according to a SOME/IP communication standard, and obtains data length information X2 and identification information Y2 from a relay request frame according to a DoIP communication standard. However, the present disclosure is not limited thereto.

The calculation unit 30 may be configured to calculate a statistic value regarding frames other than the service search frames, out of frames according to the SOME/IP communication standard. The calculation unit 30 may be configured to calculate a statistic value regarding frames other than the relay request frames, out of frames according to the DoIP communication standard. The calculation unit 30 may be configured to calculate a statistic value regarding frames according to a communication standard other than SOME/IP and DoIP.

In the relay device 100 according to the embodiment of the present disclosure, the calculation unit 30 calculates the statistic values S1, S2, S3, S4, S5, S6 on the basis of monitored information received from the monitoring unit 20. However, the present disclosure is not limited thereto. The calculation unit 30 may be configured not to calculate a part of the statistic values S1, S2, S3, S4, S5, S6. In this case, the detection unit 40 can detect an unauthorized message on the basis of the other statistic values calculated by the calculation unit 30, out of the statistic values S1, S2, S3, S4, S5, S6.

Meanwhile, a technology that enables more accurate detection of an unauthorized message in an in-vehicle network is desired.

For example, the system described in PATENT LITERATURE 1 is configured to perform authentication based on a security token, and when the security token is illegally used, an abnormality cannot be detected in some cases. The system described in PATENT LITERATURE 2 is configured to check information regarding an intrusion abnormality against a blacklist, and there are cases where an abnormality that is not registered in the blacklist cannot be detected.

In contrast to this, in the relay device 100 according to the embodiment of the present disclosure, the monitoring unit 20 monitors messages transmitted in the in-vehicle network 12. On the basis of the monitoring result by the monitoring unit 20, the calculation unit 30 calculates a statistic value regarding target messages that have been transmitted in the in-vehicle network 12 in a predetermined period and that are each a message having identification information provided for each kind of target information to be used in the vehicle 1. On the basis of the statistic value calculated by the calculation unit 30, the detection unit 40 performs a detection process of detecting an unauthorized message.

The detection method according to the embodiment of the present disclosure is a detection method performed in the relay device 100 which detects an unauthorized message in the in-vehicle network 12 installed in the vehicle 1. In this detection method, first, the relay device 100 monitors messages transmitted in the in-vehicle network 12. Next, on the basis of the monitoring result, the relay device 100 calculates a statistic value regarding target messages that have been transmitted in the in-vehicle network 12 in a predetermined period and that are each a message having identification information provided for each kind of target information to be used in the vehicle 1. Next, on the basis of the calculated statistic value, the relay device 100 performs a detection process of detecting an unauthorized message.

Thus, due to the configuration and method in which an unauthorized message is detected on the basis of a statistic value regarding the target messages each having identification information, if, for example, whether or not the calculated statistic value is abnormal is determined on the basis of a result of comparison between the calculated statistic value and a threshold set in advance on the basis of a statistic value regarding normal target messages, it is possible to improve detection accuracy of an unauthorized message.

Therefore, with the relay device and the detection method according to the embodiment of the present disclosure, an unauthorized message in the in-vehicle network can be more accurately detected.

It should be noted that the above embodiment is merely illustrative and not restrictive in all aspects. The scope of the present disclosure is defined by the scope of the claims rather than the above description, and is intended to include meaning equivalent to the scope of the claims and all modifications within the scope.

The above description includes the features in the additional notes below.

[Additional Note 1]

A detection device configured to detect an unauthorized message in an in-vehicle network installed in a vehicle, the detection device comprising:
- a monitoring unit configured to monitor messages transmitted in the in-vehicle network;
- a calculation unit configured to, on the basis of a monitoring result by the monitoring unit, calculate a statistic value regarding target messages that have been transmitted in the in-vehicle network in a predetermined period and that are each a message having identification information provided for each kind of target information to be used in the vehicle; and
- a detection unit configured to perform a detection process of detecting the unauthorized message on the basis of the statistic value calculated by the calculation unit, wherein
- each target message is a message that is according to a communication standard of SOME/IP and that is for inquiring whether or not provision of the target information is possible, or a message that is according to a communication standard of DoIP, that is from an external device connected to the in-vehicle network, and that is for starting relay of information between the external device and an in-vehicle device in the in-vehicle network.

[Additional Note 2]

A detection device including a processor and configured to detect an unauthorized message in an in-vehicle network installed in a vehicle,
the processor realizing:
- a monitoring unit configured to monitor messages transmitted in the in-vehicle network;
- a calculation unit configured to, on the basis of a monitoring result by the monitoring unit, calculate a statistic value regarding target messages that have been transmitted in the in-vehicle network in a predetermined period and that are each a message having identification information provided for each kind of target information to be used in the vehicle; and
- a detection unit configured to perform a detection process of detecting the unauthorized message on the basis of the statistic value calculated by the calculation unit.

REFERENCE SIGNS LIST

1 vehicle
10 communication processing unit
11 Ethernet cable
12 in-vehicle network
20 monitoring unit
30 calculation unit
40 detection unit
50 storage unit
100 relay device
111 in-vehicle ECU
111A TCU (in-vehicle ECU)
111B automated driving ECU (in-vehicle ECU)
111C driving support ECU (in-vehicle ECU)

111D brake sensor (in-vehicle ECU)
111E accelerator sensor (in-vehicle ECU)
111F image sensor (in-vehicle ECU)
112 diagnosis port
300 in-vehicle communication system

The invention claimed is:

1. A detection device configured to detect an unauthorized message in an in-vehicle network installed in a vehicle, the detection device comprising a processor programmed to:
monitor messages transmitted in the in-vehicle network;
on the basis of a monitoring result, calculate a statistic value regarding target messages that have been transmitted in the in-vehicle network in a specified period and that are each a message having identification information provided for each kind of target information to be used in the vehicle; and
perform a detection process of detecting the unauthorized message on the basis of a comparison of the calculated statistic value with a threshold value, wherein
performing the detection process includes determining, when the statistic value is not less than the threshold value, that the target message transmitted in the specified period is the unauthorized message,
in response to determining that the target message transmitted in the specified period is the unauthorized message, the processor is further configured to output an alarm signal to another device, the alarm signal indicating that the unauthorized message is being transmitted in the in-vehicle network, and
the statistic value is a number of the target messages of which data lengths are less than a predetermined value, out of the target messages that have been transmitted in the in-vehicle network in the specified period.

2. The detection device according to claim 1, wherein the target message is a message that inquires whether or not provision of the target information is possible.

3. The detection device according to claim 1, wherein the target message is a message from an external device connected to the in-vehicle network, the message being for starting, in a relay device in the in-vehicle network, relay of information between an in-vehicle device in the in-vehicle network and the external device.

4. A vehicle comprising the detection device according to claim 1.

5. The detection device according to claim 1, wherein the unauthorized message is a message for an external device connected to the in-vehicle network to establish a communication connection with the in-vehicle device in the in-vehicle network and is a message masquerading a normal target message.

6. A detection method to be performed in a detection device configured to detect an unauthorized message in an in-vehicle network installed in a vehicle, the detection method comprising the steps of:
monitoring messages transmitted in the in-vehicle network;
calculating, on the basis of a monitoring result, a statistic value regarding target messages that have been transmitted in the in-vehicle network in a specified period and that are each a message having identification information provided for each kind of target information to be used in the vehicle; and
performing a detection process of detecting the unauthorized message on the basis of a comparison of the calculated statistic value with a threshold value, wherein
performing the detection process includes determining, when the statistic value is not less than the threshold value, that the target message transmitted in the specified period is the unauthorized message,
in response to determining that the target message transmitted in the specified period is the unauthorized message, the method further includes outputting an alarm signal to another device, the alarm signal indicating that the unauthorized message is being transmitted in the in-vehicle network, and
the statistic value is a number of the target messages of which data lengths are less than a predetermined value, out of the target messages that have been transmitted in the in-vehicle network in the specified period.

7. A non-transitory computer-readable storage medium having, stored therein, a detection program to be used in a detection device configured to detect an unauthorized message in an in-vehicle network installed in a vehicle, the detection program being for causing a processor to:
monitor messages transmitted in the in-vehicle network;
on the basis of a monitoring result, calculate a statistic value regarding target messages that have been transmitted in the in-vehicle network in a specified period and that are each a message having identification information provided for each kind of target information to be used in the vehicle; and
perform a detection process of detecting the unauthorized message on the basis of a comparison of the calculated statistic value with a threshold value, wherein
the detection process includes determining, when the statistic value is not less than the threshold value, that the target message transmitted in the specified period is the unauthorized message,
in response to determining that the target message transmitted in the specified period is the unauthorized message, the processor is further configured to output an alarm signal to another device, the alarm signal indicating that the unauthorized message is being transmitted in the in-vehicle network, and
the statistic value is a number of the target messages of which data lengths are less than a predetermined value, out of the target messages that have been transmitted in the in-vehicle network in the specified period.

* * * * *